United States Patent
Stanton et al.

(10) Patent No.: US 11,853,276 B2
(45) Date of Patent: Dec. 26, 2023

(54) INCREMENTALLY UPDATED DATABASE SERVER DATABASE IMAGES AND DATABASE CLONING, USING WINDOWS VIRTUAL HARD DRIVES AND DATABASE SERVER BACKUPS

(71) Applicant: Nirvaha Corporation, Bellevue, WA (US)

(72) Inventors: Paul Stanton, Mill Creek, WA (US); Ramesh Parameswaran, Bellevue, WA (US)

(73) Assignee: Nirvaha Corporation, Bellevue, WA (US)

( * ) Notice: Subject to any disclaimer, the term of this patent is extended or adjusted under 35 U.S.C. 154(b) by 281 days.

(21) Appl. No.: 17/142,988

(22) Filed: Jan. 6, 2021

(65) Prior Publication Data

US 2021/0209078 A1    Jul. 8, 2021

Related U.S. Application Data

(60) Provisional application No. 62/957,889, filed on Jan. 7, 2020.

(51) Int. Cl.
| | |
|---|---|
| *G06F 16/20* | (2019.01) |
| *G06F 16/21* | (2019.01) |
| *G06F 16/27* | (2019.01) |
| *G06F 11/14* | (2006.01) |
| *G06F 16/25* | (2019.01) |

(52) U.S. Cl.
CPC ........ *G06F 16/219* (2019.01); *G06F 11/1451* (2013.01); *G06F 11/1469* (2013.01); *G06F 16/256* (2019.01); *G06F 16/275* (2019.01); *G06F 2201/80* (2013.01)

(58) Field of Classification Search
None
See application file for complete search history.

(56) References Cited

U.S. PATENT DOCUMENTS

| | | | | |
|---|---|---|---|---|
| 10,635,636 | B1* | 4/2020 | Chakraborty | ....... G06F 11/1451 |
| 2012/0158665 | A1* | 6/2012 | Lee | ..................... G06F 11/1448 |
| | | | | 707/678 |
| 2012/0324183 | A1* | 12/2012 | Chiruvolu | ........... G06F 11/2097 |
| | | | | 711/E12.103 |
| 2013/0219135 | A1* | 8/2013 | Knowles | ............... G06F 3/0673 |
| | | | | 711/E12.001 |
| 2020/0026463 | A1* | 1/2020 | Bansal | ................ G06F 11/1469 |

* cited by examiner

*Primary Examiner* — Belix M Ortiz Ditren
(74) *Attorney, Agent, or Firm* — Fenwick & West LLP

(57) ABSTRACT

A database image may be updated with incremental changes without replicating the production database. Each set of changes to the production database are stored in a differencing disk. Two or more identical chains of differencing disks are created. One chain is an active chain, and database clones may be served from the active chain for use by users. After reaching a predetermined length on an inactive chain, the differencing disks on the inactive chain are merged into a single merged differencing disk, and the inactive chain becomes an active chain, from which new database clones may be served to users. The chains may alternate between being inactive and active chains.

18 Claims, 6 Drawing Sheets

INCREMENTALLY UPDATED DATABASE SERVER DATABASE IMAGES AND DATABASE CLONING, USING WINDOWS VIRTUAL HARD DRIVES AND DATABASE SERVER BACKUPS

CROSS REFERENCE TO RELATED APPLICATIONS

This application claims the benefit of U.S. Provisional Application No. 62/957,889, filed Jan. 7, 2020, which is incorporated by reference in its entirety.

TECHNICAL FIELD

This disclosure relates generally to computer systems, and more specifically to database technology.

BACKGROUND

Relational Database Management Systems (RDBMS), such as Microsoft® SQL (Structured Query Language) Server, include a backup system composed of a full backup, and optional differential or transaction log backup files. SQL Server backups are restored to return a database server to a prior state, or to deliver databases to non-source SQL Server instances or containers. Each backup file (full, differential, or transaction log) is part of an ordered list based on a log sequence number (LSN). Differential or transaction log backups cannot be applied separately, but must follow a full backup, and must be applied in LSN sequence. Each restore of a full backup, or restore of the full backup plus one or more differential or log shipping backups, moves from a "no recovery" state to a "recovery" state when completed, to make the database accessible for use. On completion of the restore, database(s) are put into a "recovery" state, and no longer accept additional differential or log shipping backups.

The SQL Server Relational Database Management System is composed of custom "user" databases composed of schema and objects, and system databases including Master, Model, MSDB, Temp, and others. Full, Differential, or Transaction Log backup files of user databases includes information to restore to SQL Server instances or containers, but the state of the backup restore operation and LSN sequence is managed by system databases including MSDB.

Microsoft Windows includes support of Virtual Hard Drives (VHD or VHDX, collectively "VHD"), which are commonly used to create and manage Virtual Machines (VM). Virtual Machines include operating system files and libraries, and can additionally include SQL Server, system, and user databases. A source VHD supports creation of differencing disks (clones), with each clone including file pointers to the parent VHD for read-only data access. Clones copy data from the source VHD using a "copy on write" design to save changes made to the clone. VHDs can be used to store SQL Server databases, which are cloned to create read/write databases (database clones) that are mounted to SQL Server instances or containers.

For both Virtual Machines and SQL Server database images, the parent VHD image is a full byte copy of the software environment, and differencing disks or clones are lightweight copies (<40 MB in storage) with i-node file pointers to the source image. Cloned VHDs can also be cloned, creating a linked set of VHDs. Linked VHD chains are known to reduce read/write performance. VHD merge operations can be used to shorten linked chains but result in the loss of clones attached to the merged VHDs.

Docker containers are a form of application packaging and delivery, with each container including a full set of the application files, and libraries. Containers are created from a configuration file, or Docker file, and can be stored as a docker image, and support delivery of identical application environments. SQL Server containers can mount databases located in a VHD database clone, for an efficient combination of application creation with cloned databases.

SUMMARY

A database cloning system provides the capability to serve current versions of a production database to users. A VHD database image may be updated with incremental changes without replicating the production database. Each set of changes to the production database are stored in a differencing disk. The differencing disk may be cloned and provided to users, while maintaining support for clones generated from previous differencing disks. Two or more identical chains of differencing disks may be created. One chain is an active chain, and database clones may be served from the active chain for use by users. After reaching a predetermined length on an inactive chain, the differencing disks on the inactive chain are merged into a single merged differencing disk, and the inactive chain becomes an active chain, from which new database clones may be served to users. The chains may alternate between being inactive and active chains.

In some embodiments, a method may comprise initiating a database server instance, creating a VHD, mounting the parent VHD to the database server instance, restoring a full database server backup to the parent VHD, and unmounting the parent VHD from the database server instance. The method may further comprise generating a replicated differencing disk chain from the parent VHD, wherein the replicated differencing disk chain comprises an active chain and an inactive chain. The method may further comprise creating a first clone by cloning a most recent VHD differencing disk on the active chain of the replicated differencing disk chain and merging a plurality of VHD differencing disks on the inactive chain into a single merged differencing disk In some embodiments, a method may comprise generating a parent source VHD, adding a first differencing disk to an active differencing disk chain depending from the parent source VHD, adding the first differencing disk to an inactive differencing disk chain depending from the parent source VHD, creating a first clone by cloning the first differencing disk on the active differencing disk chain, and delivering the first clone to a user.

The method also may be comprised as program code (or software or instructions) stored on a non-transitory computer readable storage medium and executable by one or more processors. In addition, the method also may be embodied as functional modules that may be structured to include program code and execute through a processor, controller, field programmable gate array (FPGA), or application specific integrated circuit (ASIC).

Figure 1:
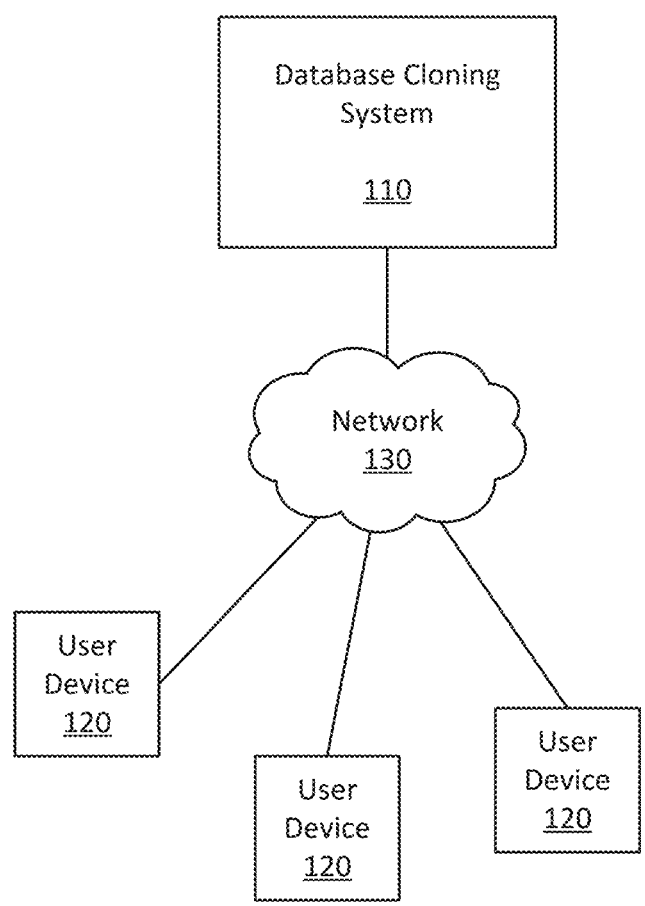
FIG. 1 is a system environment for a database cloning system, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

The systems and methods described herein provide the capability to serve current versions of a production database to users. A database image may be updated with incremental changes without replicating the production database. Each set of changes to the production database are stored in a differencing disk. Two or more identical chains of differencing disks are created. One chain is an active chain, and database clones may be served from the active chain for use by users. After reaching a predetermined length on an inactive chain, the differencing disks on the inactive chain are merged into a single merged differencing disk, and the inactive chain becomes an active chain, from which new database clones may be served to users. The chains may alternate between being inactive and active chains.

By way of example, the descriptions herein may be in the context of SQL server systems. However, the principles noted are applicable to other database server configurations that provide incremental backups or logs. With such in mind, reference is initially made to a SQL Server backup and restore process that may require a sequence of Full and optional Differential or Transaction Log backups. Each SQL Server restore includes a Full backup which requires time to complete and consumes considerable storage. The systems and methods described herein simplify distribution and restoration of SQL Server databases by creating a SQL Server database image with a Full backup restored to a Virtual Hard Drive (VHD image) that is updated incrementally over time with Differential or Transaction Log backups (updated image), with each image supporting delivery of read/write SQL Server databases for use via differencing disks (clones).

The described system allows a database image to be updated in seconds with Differential or Log Shipping backups. Clones of the image can be created and delivered in seconds. Hundreds or thousands of image updates and clones can be supported from a single Full backup, with significant time and storage savings. The systems applies replicated VHD differencing disk chains to preserve VHD performance and support of the most recently created database images and clones.

The described system combines VHDs with matched SQL Server system databases to support incremental updates of a VHD image created with a Full backup stored in "no recovery" state, with image maintenance accomplished by merging VHDs in a linked chain of differencing disks. Each image can be used to create and deliver read/write databases by differencing disks (clones). The SQL Server system databases used to support the image build are stored and re-applied to support image updates.

The described system comprises two identical copies of a database container or two database servers. The identical database servers may be stored on the same or different machines. The identical database servers comprise identical system databases, including MSDB and master. A first database server applies a transaction log backup and creates a first differencing disk for a transaction log backup. The system differences the first differencing disk to obtain a second differencing disk. A second database server changes the database files on the second differencing disk to a recovery state which makes the second differencing disk available to users.

The disclosed configuration saves time and storage, allowing for an image to be updated in seconds or minutes, and cloned databases to be delivered in seconds. Where conventional VHD use demands that differencing disk chains be merged regularly with resulting loss of recently created clones, the invention provides for differencing disk chain maintenance that prolongs use of differencing disks and preserves support for recently created clones.

Example System Environment

FIG. 1 illustrates a system environment 100 for a database cloning system 110, in accordance with various embodiments. The database cloning system 100 is configured to provide current versions of a production database to users. The system environment 100 comprises the database cloning system 110, and one or more user (or client) devices 120. The various components are configured to communicate over a network 130. In alternative configurations, different and/or additional components may be included in the system environment 100.

The database cloning system 110 is configured to provide access to current versions of a production database to the user devices. The production database comprises one or more databases configured to store information. The database cloning system is configured to deliver, receive, and modify information at the direction of authorized users. The production database may comprise a relational database. In some embodiments, the production database 120 may be a separate component from the database cloning system 110.

The database cloning system 110 may comprises one or more database servers and processors. The database cloning system 110 may comprise a relational database management system (RDBMS), such as SQL server. As noted above, although described primarily herein with reference to SQL server, the system and methods described herein may be utilized with other database servers that provide incremental backups or logs. The database cloning system 110 maintains a production server database. The database cloning system 110 may comprise a virtual hard drive (VHD), also referred to as a virtual hard disk. The database cloning system 110 is configured to store a database full backup image and a chain of differencing disks, as further described with reference to FIGS. 2-5.

The user devices 120 are one or more computing devices capable of receiving user input as well as transmitting and/or receiving data via the network 130. In one embodiment, a user device 120 is a conventional computer system, such as a desktop or a laptop computer. Alternatively, a user device 120 may be a device having computer functionality, such as a mobile telephone, a smartphone, or another suitable device. A user device 120 is configured to communicate via the network 130 to retrieve, create, or modify information in the production database. In one embodiment, a user device 120 executes an application allowing a user of the user device 120 to interact with the database cloning system 110. For example, a user device 120 executes a browser application to enable interaction between the user device 120 and the database cloning system 110 via the network 130.

The user devices 120 are configured to communicate via the network 130, which may comprise any combination of local area and/or wide area networks, using both wired and/or wireless communication systems. In one embodiment, the network 130 uses standard communications technologies and/or protocols. For example, the network 130 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 140 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 140 may be represented using any suitable format, such as hypertext markup language (HTML) or extensible markup language (XML). In some embodiments, all or some of the communication links of the network 130 may be encrypted using any suitable technique or techniques.

Each of the computing devices that comprise the database cloning system 110 (including any server computers), the user devices 120, and network devices may be computing devices as noted. A computing device may have one or more processors (e.g., central processing unit, graphical processing unit, tensor processing unit, a state machine, and/or controller). The computing device may include a memory (e.g., static and/or dynamic random access memory). The computing device also may have a non-transitory computer readable storage medium (e.g., a non-volatile memory and/or magnetic disk). The computing device also may include a communications interface (e.g., wireless communication or ethernet). The computing device also may include one or more input/output devices (e.g., a keyboard or mouse). The computing device may be configured to store program code in the non-transitory storage medium. The program code also may be stored in the memory. The program code may be executable by the one or more processors. The program code may be comprised of one or more instructions and may be referred to as software and/or firmware. The program code may embody the processes and/or functional aspects of the disclosed configurations as described herein with FIGS. 2 through 5B.

Example Cloning Process and Delivery

Figure 2:
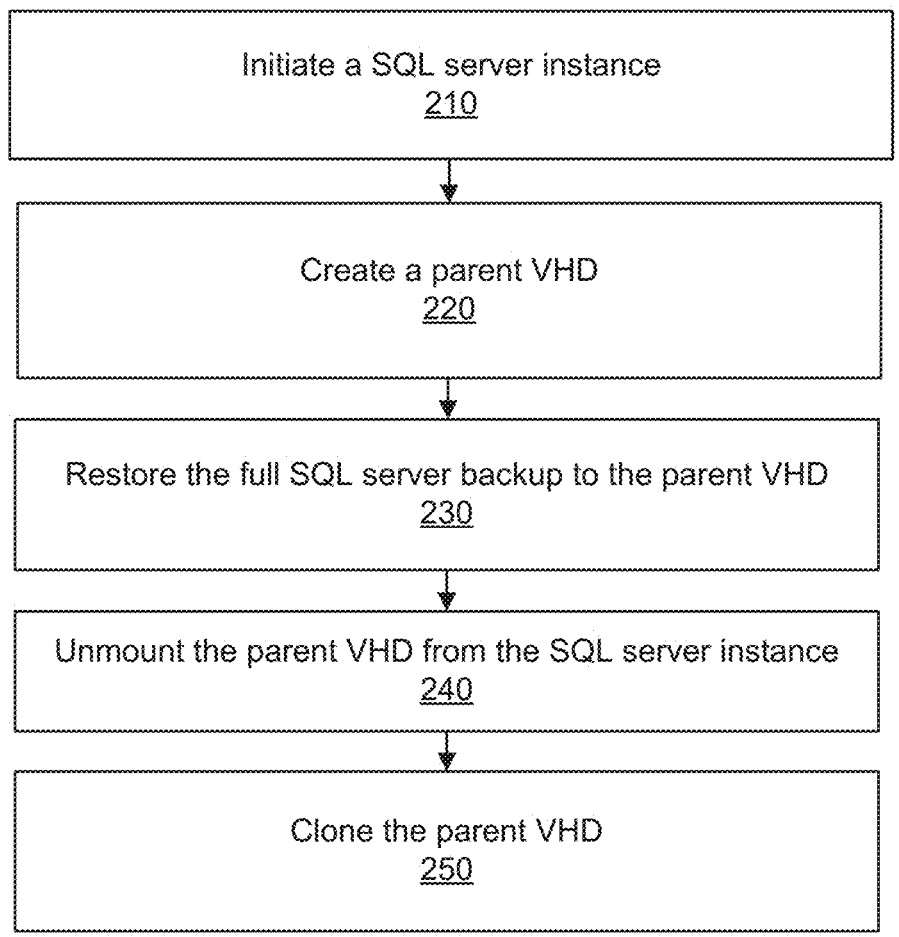
FIG. 2 is a flowchart of a process for cloning a database image, in accordance with an embodiment.

Referring to FIG. 2, a flowchart 200 of an example process for cloning a database image is illustrated in accordance with an embodiment. The described operations may be performed by components of a database cloning system, such as the database cloning system 110 of FIG. 1. Other entities may perform some or all of the steps in FIG. 2 in other embodiments. Embodiments may include different and/or additional steps or perform the steps in different orders.

A database cloning system initiates 210 a SQL server instance. The SQL server instance comprises a database image. The database image may be built within a container, and a VHD may be created and mounted to the container. By way of example, the container may be a data structure that stores and manages and/or organizes data objects (e.g., virtual objects). The objects may be the data and/or processes for manipulating the data. The database image may be defined by a configuration file, a Docker file, or supplied via programmatic input. The database image includes one or more full SQL server backups. The database image may comprise SPL (SPL Programming Language) scripts, PowerShell scripts, and other executable programs that can be run on clones when created.

The database cloning system creates (or generates) 220 a parent VHD. The parent VHD is created with a sufficient size to have sufficient storage for the full SQL server backups. In order to determine to proper size for the parent VHD, the database cloning system may run a query on the full SQL server backup to obtain the sizes of the files contained within the full SQL server backup, and the database cloning system may create the parent VHD with a size matching the size of the files contained within the full SQL server backup. The parent VHD is mounted to the SQL server instance.

The database cloning system restores 230 the full SQL server backups to the parent VHD. The full SQL server backups may be restored in a no-recovery state, such that the information in the full SQL server backups is not accessible to users. In some embodiments, the database cloning system may perform a partial backup, and the cloning processes described herein may be applied to the partial backup.

After completion of restoring the full SQL server backups to the parent VHD, the database cloning system unmounts 240 the parent VHD from the SQL server instance. The database cloning system saves the parent VHD with an assigned image name, along with create time scripts or executable programs.

The database cloning system clones 250 the parent VHD. The database clones may comprise identical schema and data as the full SQL server backups stored in the parent VHD. The database clones may be mounted to SQL server instances or containers in a recovery state, such that the information in the database clones may be accessed by users. The database cloning system may apply the create time scripts or executable programs prior to presenting the database clones for use. The SQL server instance used to support the parent VHD image build may be saved or backed up for future image updates.

Figure 3:
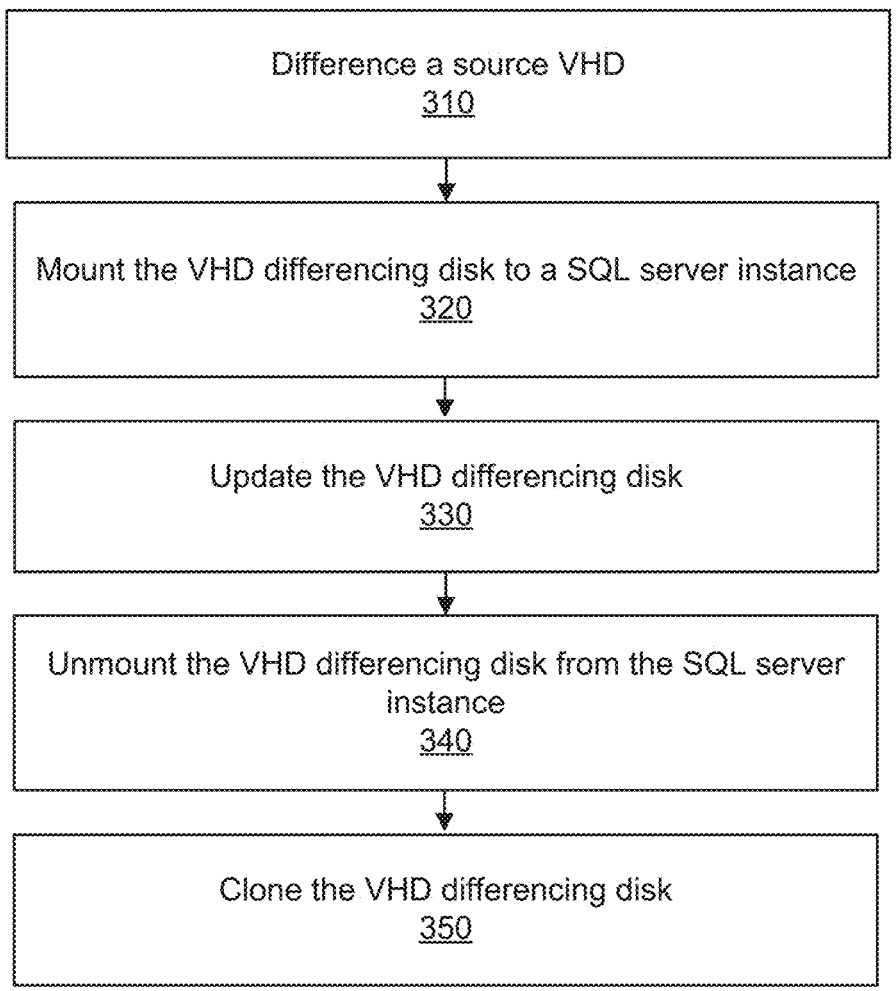
FIG. 3 is a flowchart of a process for delivering database clones from an updated image, in accordance with an embodiment.

Referring to FIG. 3, a flowchart 300 of an example process for delivering database clones from an updated image is illustrated according to various embodiments. The described operations may be performed by components of a database cloning system, such as the database cloning system 110 of FIG. 1. Other entities may perform some or all of the steps in FIG. 3 in other embodiments. Embodiments may include different and/or additional steps or perform the steps in different orders. In some embodiments, the process described with reference to FIG. 3 may be a continuation of the process described with reference to FIG. 2.

The database cloning system comprises two identical copies of a database container or database server. The identical database servers comprise identical system databases including MSDB and master.

The database cloning system differences 310 a source VHD. The source VHD may be the parent VHD described with reference to FIG. 2. The differencing creates a VHD differencing disk. The VHD differencing disk describes changes to the source VHD. The VHD differencing disk may be created with optimizations for storage using Microsoft documented interfaces.

The database cloning system mounts 320 the VHD differencing disk to a SQL server instance. The SQL server instance contains the system databases used in the latest image build or update. In some embodiments, a copy of the system database may be restored to the SQL server instances. The VHD differencing disk is linked to the source VHD.

The database cloning system updates 330 the VHD differencing disk. The database cloning system may update the VHD differencing disk by restoring differential or transaction log backups. The system databases reflect the changes in the SQL server log sequence number (LSN) backup LSN history.

On completion of the backup restores, the database cloning system unmounts 340 the VHD differencing disk from the SQL server instance. The database cloning system saves the VHD differencing disk in a no-recovery state with an assigned image name, along with created time scripts or executable programs.

The database cloning system clones the VHD differencing disk. The new clones may be mounted to SQL server instances or containers in a recovery state, such that the information in the database clones may be accessed by users. The database cloning system may apply the create time scripts or executable programs prior to presenting the database clones for use. The SQL server instance used to support the VHD image build may be saved or backed up for future image updates.

The image update process can continue indefinitely, creating a linked chain of image differencing disks and clones. Clones are created from the most recent VHD differencing disk, but earlier created clones continue to operate. The number of VHDs supported by the Windows operating system is limited, and performance can be hindered as the length of the differencing disk chain grows.

Figure 4:
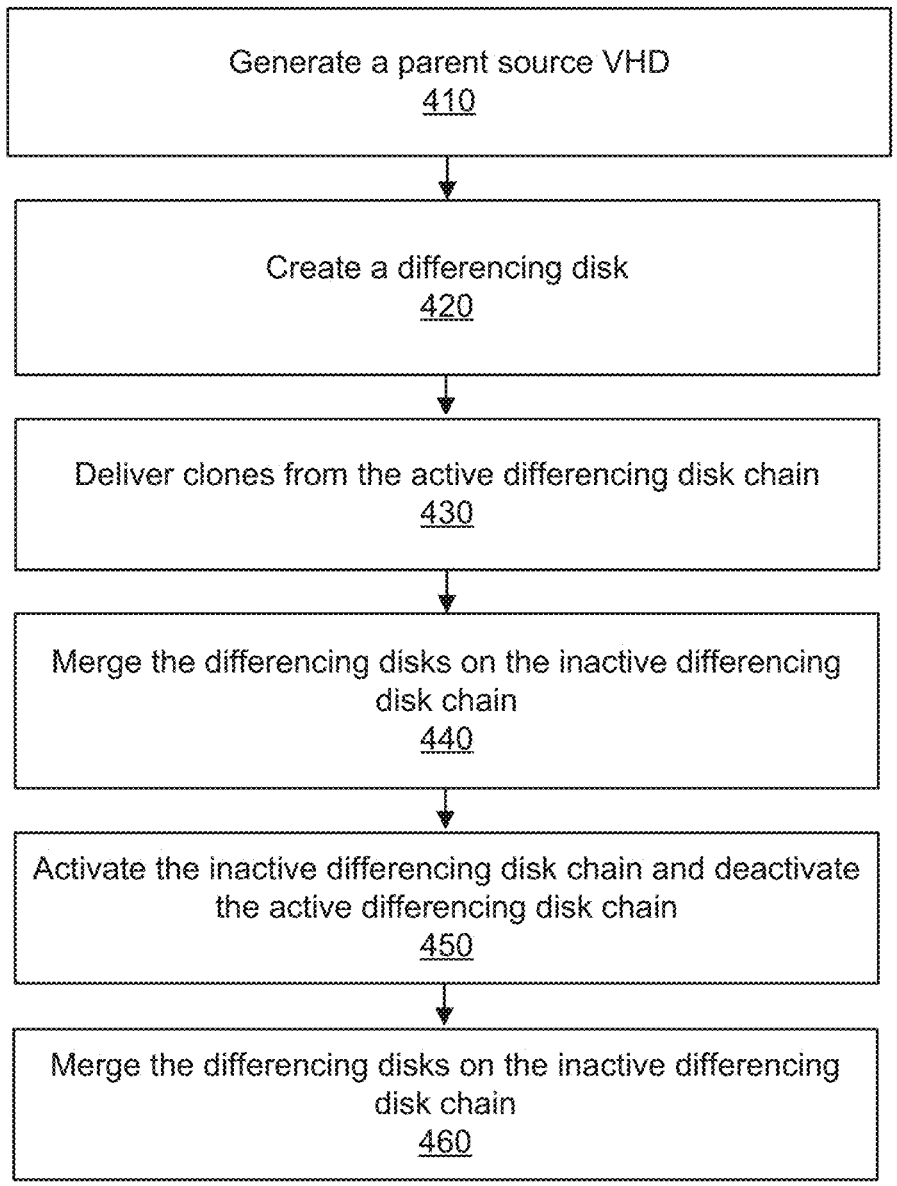
FIG. 4 is a flowchart of a process for maintaining a VHD replica chain, in accordance with an embodiment.

Referring to FIG. 4, a flowchart of an example process for maintaining a VHD replica chain is illustrated according to various embodiments. A VHD replica chain is created to support image maintenance and preserve support for the most recently created clones. The described operations may be performed by components of a database cloning system, such as the database cloning system 110 of FIG. 1. Other entities may perform some or all of the steps in FIG. 4 in other embodiments. Embodiments may include different and/or additional steps or perform the steps in different orders. In some embodiments, the process described with reference to FIG. 4 may be a continuation of the processes described with reference to FIG. 2 or FIG. 3.

The database cloning system generates 410 a parent source VHD. The parent source VHD may be an embodiment of the parent source VHD described with reference to FIG. 2. The parent source VHD may be stored in a no recovery state. The parent source VHD supports creation of two or more identical VHD differencing disk chains. A first differencing disk chain is assigned to support creation and delivery of clones, and is referred to as the active chain. A second differencing disk chain is designated as inactive.

The database cloning system creates 420 a VHD differencing disk. The differencing disk may be created as described with reference to FIG. 3. The differencing disk may be created at user-set intervals. For example, a new differencing disk may be created once per hour, once per day, or at any other suitable frequency. The differencing disk may be saved on the first (active) differencing disk chain and on the second (inactive) differencing disk chain. Differencing disks are added to the replicated differencing chains until a predetermined number of inactive differencing disks is reached. The predetermined number of inactive differencing disks may be any suitable number, for example, 5-10, 3-100, or any other suitable number.

The database cloning system delivers 430 clones from the most recent differencing disk on the first (active) differencing disk chain to users. The database cloning system continues to support the clones from previous differencing disks on the first (active) differencing chain.

In response to reaching the predetermined number of inactive differencing disks, the database cloning system merges 430 the differencing disks in the second (inactive) differencing chain into a single differencing disk. The second (inactive) differencing chain now comprises a single merged differencing disk.

The database cloning system activates 450 the second differencing chain to be the active chain, and the database cloning system deactivates the first differencing chain to be the inactive chain. The second (now active) differencing disk chain now supports delivery of new clones. The first (now inactive) differencing disk chain continues to be updated and supports earlier created clones.

When the first (now inactive) differencing disk chain reaches the predetermined number of inactive updates, the database cloning system merges 460 the differencing disks on the first differencing disk chain to a single differencing disk. The first differencing disk chain is activated to become the active differencing disk chain again. New clones are delivered to users from the first (now active) differencing disk chain. The clones created from the second (now inactive) differencing disk chain continue to be supported.

The database cloning system may continue to alternate between which differencing disk chain is active and merge the differencing disks on the inactive differencing disk chain when reaching the predetermined chain length. Use of a replicated identical differencing disk chains minimizes VHD chain length, preserving disk performance, and allows for merging differencing disk chains while preserving support for the most recently created clones. The number of replicated differencing disk chains can be increased from two to three, or more. A set of two differencing disk chains supports the most recent half of updated images and consumes up to one-third of the available VHD capacity. A set of three identical differencing disk chains supports the most recent two thirds of updated images and consumes up to one-half of the available VHD capacity. The invention supports the creation of any number of identical differencing disk chains, with the noted trade-off between the proportion of merged (lost) clones, and VHD consumption.

Example Replicated Differencing Chain

Figure 5A:
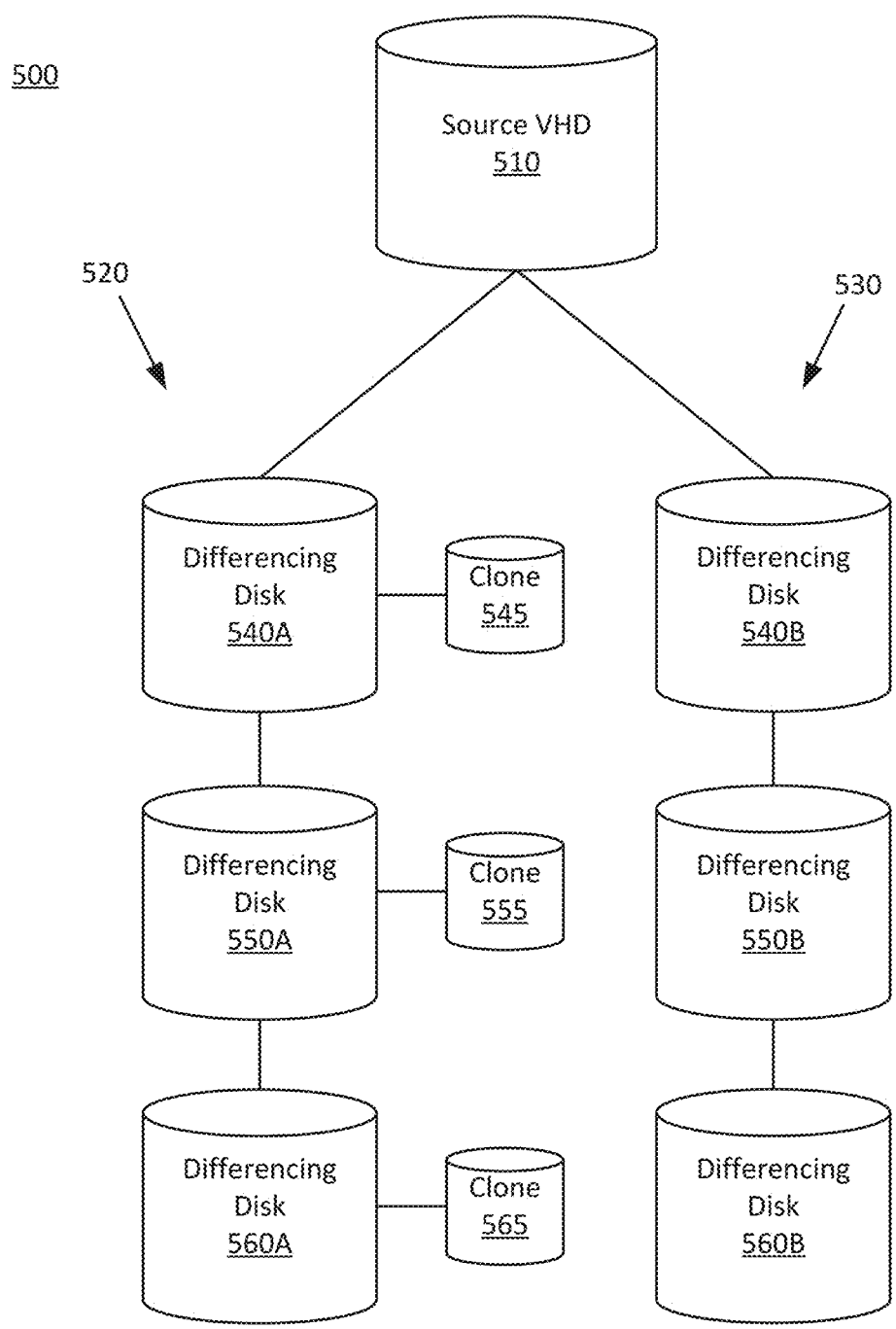
FIG. 5A is a schematic diagram of an example replicated differencing chain, in accordance with an embodiment.

Referring to FIG. 5A, a schematic diagram of an example replicated differencing chain 500 is illustrated in accordance with an embodiment. A source VHD 510 may contain a full SQL server backup database image. The replicated differencing chain 500 comprises a first chain 520 and a second chain 530. The first chain 520 may be an active chain, and the second chain 530 may be an inactive chain. Each time a new differencing disk is created, the differencing disk is added to both the first chain 520 and the second chain 530. The most recent differencing disk on the active chain may be cloned, and the clones may be delivered to users. For example, when a first differencing disk is created, the differencing disk is added to the first chain 520 as differencing disk 540A and to the second chain as differencing disk 540B. Clones 545 may be delivered to users. Similarly, when a second differencing disk is created, the differencing disk is added to the first chain 520 as differencing disk 550A and to the second chain as differencing disk 550B, and clones 555 may be delivered to users. Similarly, when a third differencing disk is created, the differencing disk is added to the first chain 520 as differencing disk 560A and to the second chain as differencing disk 560B, and clones 565 may be delivered to users.

Figure 5B:
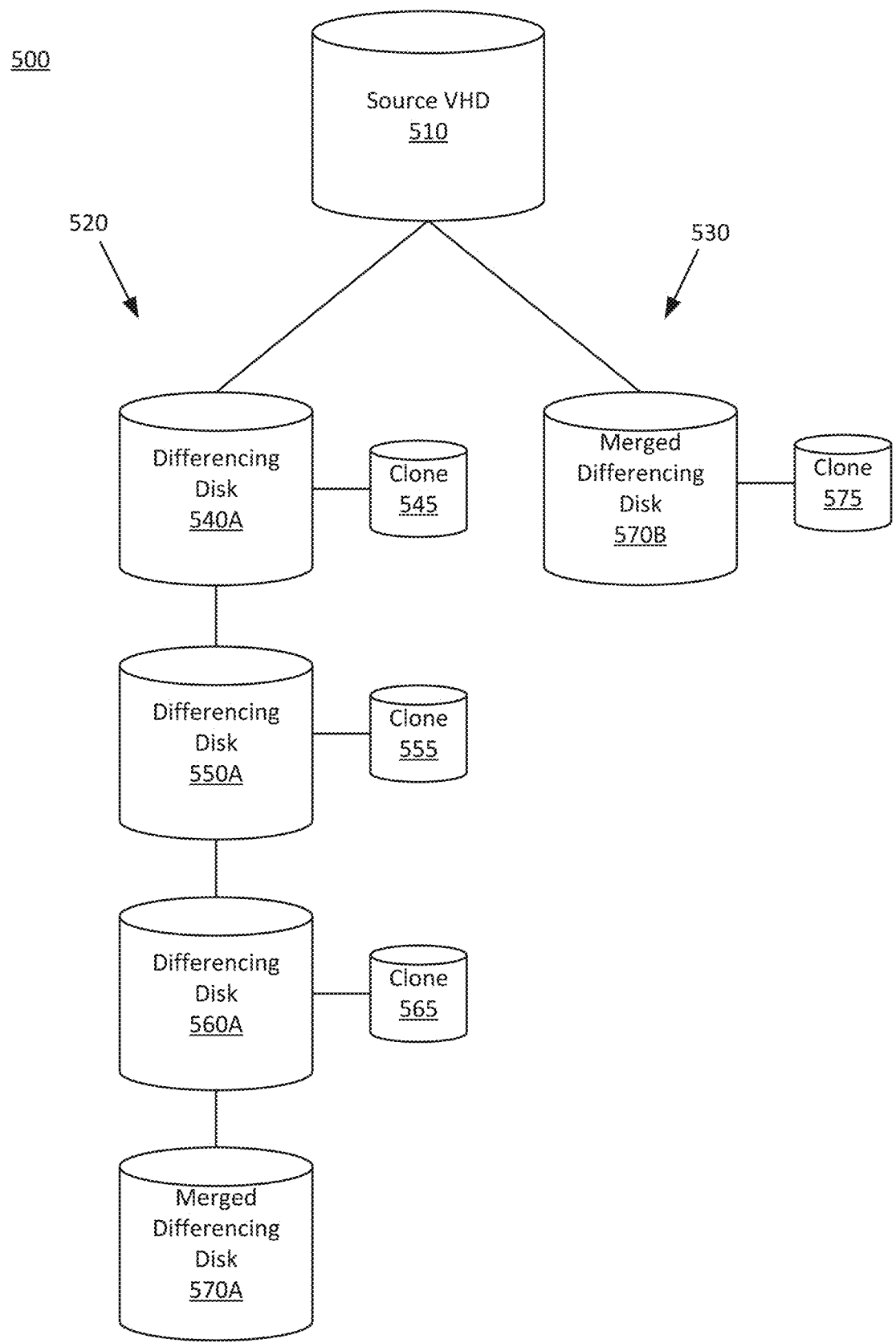
FIG. 5B is a schematic diagram of the replicated differencing chain after a differencing disk merge, in accordance with an embodiment.

Referring to FIG. 5B, the replicated differencing chain 500 is illustrated after a differencing disk merge, in accordance with an embodiment. The replicated differencing chain 500 may have a predetermined maximum length of three new differencing disks on an inactive chain. In response to a new differencing disk being created, the new differencing disk may be merged with the differencing disks on the inactive chain into a merged differencing disk. The merged differencing disk may be added to the second chain 530 as merged differencing disk 570B and to the first chain 520 as merged differencing disk 570A.

The second chain 530 may be activated. The first chain 520 may be inactivated. The merged differencing disk 570B may be cloned, and clones 575 may be provided to users. However, the clones 545, 555, 565 continue to be supported.

Subsequent differencing disks may be added to both the first chain 520 and the second chain 530. In response to receiving three more differencing disks, the differencing disks on the first chain 520 may be merged in to a single merged differencing disk, and the first chain 520 may be activated. The previous clones 545, 555, 565 from the first chain 520 may no longer be supported. However, the clones 575 and others created from the second chain 530 may be supported until the second chain 530 subsequently merges its differencing disks. The replicated differencing chain 500 may indefinitely alternate which differencing chain is active and which differencing chain records are merged. In such manner, the replicated differencing chain 500 may provide users with access to current versions of a production database while maintaining support of recent clones, without creating extensively long differencing chains.

Additional Considerations

The described systems and methods allow users to access current production data without restoring a full backup. In contrast to restoring a full backup, which may take several hours, the system may deliver cloned differencing disks with current production data to users in a matter of seconds. Thus, users may quickly access current production data without waiting hours for a full backup.

Additionally, the described system and methods decrease the length of differencing disk chains while supporting previously delivered clones to users. Long VHD chains are known to reduce read/write performance. Conventional VHD use involves frequent merge operations to decrease the length of differencing disk chains. However, with conventional merging operations, the ability to support clones from the merged differencing disks is lost. The described system provides a replicated differencing disk chain that includes an active chain and an inactive chain. By merging differencing disks on the inactive chain without simultaneously merging the differencing disks on the active chain, the recently created clones from the differencing disks on the active chain continue to be supported. Thus, users may continue to use recently created clones to access production data.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    initiating a database server instance;
    creating a parent virtual hard disk (VHD);
    mounting the parent VHD to the database server instance;
    restoring a full database server backup to the parent VHD;
    unmounting the parent VHD from the database server instance;
    generating a replicated differencing disk chain from the parent VHD, wherein the replicated differencing disk chain comprises an active chain and an inactive chain;
    creating a first clone by cloning a most recent VHD differencing disk on the active chain of the replicated differencing disk chain; and
    merging a plurality of VHD differencing disks on the inactive chain into a single merged differencing disk, wherein the plurality of VHD differencing disks are merged in response to the inactive chain reaching a predetermined length.

2. The method of claim 1, further comprising delivering the first clone to a user.

3. The method of claim 1, further comprising: changing the inactive chain to be active; and
    changing the active chain to be inactive.

4. The method of claim 3, further comprising adding a new VHD differencing disk to the inactive chain and the active chain.

5. The method of claim 4, further comprising creating a second clone by cloning the new VHD differencing disk on the active chain.

6. The method of claim 1, wherein the parent VHD comprises a database image.

7. A non-transitory computer readable storage medium comprising stored instructions, the stored instructions when executed cause at least one processor to:
    initiate a database server instance;
    create a parent virtual hard disk (VHD);
    mount the parent VHD to the database server instance;
    restore a full database server backup to the parent VHD;
    unmount the parent VHD from the database server instance;
    generate a replicated differencing disk chain from the parent VHD, wherein the replicated differencing disk chain comprises an active chain and an inactive chain;
    create a first clone by cloning a most recent VHD differencing disk on the active chain of the replicated differencing disk chain; and
    merge a plurality of VHD differencing disks on the inactive chain into a single merged differencing disk, wherein the plurality of VHD differencing disks are merged in response to the inactive chain reaching a predetermined length.

8. The non-transitory computer readable storage medium of claim 7, wherein the stored instructions when executed cause the at least one processor to deliver the first clone to a user.

9. The non-transitory computer readable storage medium of claim 7, wherein the stored instructions when executed cause the at least one processor to:
    change the inactive chain to be active; and
    change the active chain to be inactive.

10. The non-transitory computer readable storage medium of claim 9, wherein the stored instructions when executed cause the at least one processor to add a new VHD differencing disk to the inactive chain and the active chain.

11. The non-transitory computer readable storage medium of claim 10, wherein the stored instructions when executed cause the at least one processor to create a second clone by cloning the new VHD differencing disk on the active chain.

12. The non-transitory computer readable storage medium of claim 7, wherein the parent VHD comprises a database image.

13. A computer system comprising:
    a processor; and
    a non-transitory computer readable storage medium comprising stored instructions, the stored instructions when executed cause the processor to:
        initiate a database server instance;
        create a parent virtual hard disk (VHD);
        mount the parent VHD to the database server instance;
        restore a full database server backup to the parent VHD;
        unmount the parent VHD from the database server instance;
        generate a replicated differencing disk chain from the parent VHD, wherein the replicated differencing disk chain comprises an active chain and an inactive chain;
        create a first clone by cloning a most recent VHD differencing disk on the active chain of the replicated differencing disk chain; and
        merge a plurality of VHD differencing disks on the inactive chain into a single merged differencing disk, wherein the plurality of VHD differencing disks are merged in response to the inactive chain reaching a predetermined length.

14. The computer system of claim 13, wherein the stored instructions when executed cause the processor to:
    change the inactive chain to be active; and
    change the active chain to be inactive.

15. The computer system of claim 14, wherein the stored instructions when executed cause the processor to add a new VHD differencing disk to the inactive chain and the active chain.

16. The computer system of claim 15, wherein the stored instructions when executed cause the processor to create a second clone by cloning the new VHD differencing disk on the active chain.

17. The computer system of claim 13, wherein the parent VHD comprises a database image.

18. The computer system of claim 13, wherein the stored instructions when executed cause the processor to deliver the first clone to a user.

* * * * *